(12) United States Patent
Holm et al.

(10) Patent No.: US 11,295,732 B2
(45) Date of Patent: Apr. 5, 2022

(54) DYNAMIC INTERPOLATION FOR HYBRID LANGUAGE MODELS

(71) Applicant: SoundHound, Inc., Santa Clara, CA (US)

(72) Inventors: Steffen Holm, San Francisco, CA (US); Terry Kong, Sunnyvale, CA (US); Kiran Garaga Lokeswarappa, Mountain View, CA (US)

(73) Assignee: SoundHound, Inc., Santa Clara, CA (US)

( * ) Notice: Subject to any disclaimer, the term of this patent is extended or adjusted under 35 U.S.C. 154(b) by 63 days.

(21) Appl. No.: 16/529,730

(22) Filed: Aug. 1, 2019

(65) Prior Publication Data

US 2021/0035569 A1 Feb. 4, 2021

(51) Int. Cl.
*G10L 15/197* (2013.01)
*G10L 15/02* (2006.01)
*G10L 15/22* (2006.01)
*G10L 15/16* (2006.01)
*G10L 15/18* (2013.01)

(52) U.S. Cl.
CPC .......... *G10L 15/197* (2013.01); *G10L 15/02* (2013.01); *G10L 15/16* (2013.01); *G10L 15/1815* (2013.01); *G10L 15/22* (2013.01); *G10L 2015/025* (2013.01)

(58) Field of Classification Search
CPC ... G10L 15/197; G10L 15/16; G10L 15/1815; G10L 15/02; G10L 15/22; G10L 2015/025
See application file for complete search history.

(56) References Cited

U.S. PATENT DOCUMENTS

| | | | | | |
|---|---|---|---|---|---|
| 6,167,377 | A | * | 12/2000 | Gillick | G10L 15/063 704/240 |
| 2001/0014859 | A1 | * | 8/2001 | Itoh | G10L 15/197 704/240 |
| 2012/0271617 | A1 | * | 10/2012 | Nakajima | G10L 15/183 704/2 |

(Continued)

OTHER PUBLICATIONS

Masumura et al. "Joint Unsupervised Adaptation of N-gram and RNN Language Models via LDA-based Hybrid Mixture Modeling", Proceedings of APSIPA Annual Summit and conference Dec. 2017, p. 1588-1591 (Year: 2017).*

(Continued)

*Primary Examiner* — Huyen X Vo
*Assistant Examiner* — Darioush Agahi
(74) *Attorney, Agent, or Firm* — Platinum Intellectual Property LLP

(57) ABSTRACT

In order to improve the accuracy of ASR, an utterance is transcribed using a plurality of language models, such as for example, an N-gram language model and a neural language model. The language models are trained separately. They each output a probability score or other figure of merit for a partial transcription hypothesis. Model scores are interpolated to determine a hybrid score. While recognizing an utterance, interpolation weights are chosen or updated dynamically, in the specific context of processing. The weights are based on dynamic variables associated with the utterance, the partial transcription hypothesis, or other aspects of context.

16 Claims, 9 Drawing Sheets

(56) References Cited

U.S. PATENT DOCUMENTS

| | | | | |
|---|---|---|---|---|
| 2015/0370787 A1* | 12/2015 | Akbacak | ................. | G06F 40/47 704/2 |
| 2018/0012594 A1* | 1/2018 | Behzadi | ................. | G10L 15/14 |
| 2020/0027444 A1* | 1/2020 | Prabhavalkar | .......... | G10L 15/16 |
| 2020/0043468 A1* | 2/2020 | Willett | .................. | G06N 3/082 |
| 2020/0160838 A1* | 5/2020 | Lee | ........................ | G10L 15/02 |

OTHER PUBLICATIONS

Graham Neubig, et al., Generalizing and hybridizing count-based and neural language models. arXiv preprint arXiv:1606.00499. Jun. 1, 2016.

Babak Damavandi, et al., NN-grams: Unifying neural network and n-gram language models for speech recognition. arXiv preprint arXiv:1606.07470. Jun. 23, 2016.

* cited by examiner

DYNAMIC INTERPOLATION FOR HYBRID LANGUAGE MODELS

FIELD OF THE INVENTION

The present invention is in the field of automatic speech recognition, and more specifically, of statistical language modeling.

BACKGROUND

Automatic Speech Recognition (ASR) is a technology used for applications in dictation, translation, and natural language understanding. An ASR system, given a speech utterance as input, transcribes the utterance into text. An ASR system depends on multiple components to assign a probability score to each transcription hypothesis. One component, the Acoustic Model (AM) assigns probability scores to phoneme sequences. With the help of a phonetic dictionary, the phoneme sequences are segmented into word sequences having AM scores over word sequences. Next, a statistical language model (SLM), or language model (LM) for short, assigns probability scores to sequences of words based on linguistic frequency.

Language models play a very large role in the accuracy of ASR systems. Traditional LMs are based on N-gram statistics. N-grams are sequences of up to N consecutive words. Neural LMs were introduced more recently as an alternative way to score transcription hypotheses. Neural LMs have shown capable of improving the accuracy of some transcriptions.

N-gram based LMs and neural LMs serve similar purposes within ASR systems, assigning scores of merit to hypothesized transcriptions. However, neither N-gram based LMs nor neural network LMs are well suited for all speech recognition applications. What is needed is an ASR system with improved LM performance.

SUMMARY

An ASR system can be designed to use a hybrid language model, consisting of two or more component language models. The different LMs may be of different types and may be trained independently. During speech recognition, each LM generates a probability score for a word sequence hypothesis, and the probability scores from each of the component models are combined dynamically into a hybrid model score.

For example, a weighted sum of probability scores from different component models may be used to compute a hybrid score using interpolation weights. The interpolation weights can be dynamically determined, based on the predicted relative strength of each component model, at specific times during the recognition process. The idea is to reduce the ASR system's error rate by giving a higher weight to the score of a model that, in the current context, is presumed to give better results.

An utterance is processed according to a plurality of language models, such as for example an N-gram model and a neural network model. At each point in the processing of the utterance, when a transcription hypothesis is considered, each of the plurality of models outputs a probability score for a transcription hypothesis. This model score from each model may be an estimate of the probability of the transcription hypothesis, a function of said probability estimate, such as for example, the logarithm of the probability estimate, or another figure of merit for the transcription hypothesis.

In a hybrid LM, model scores from the component models are interpolated to determine a hybrid LM score. The interpolation can use several methods to determine the hybrid LM score, such as for example a weighted sum of the scores of the component LMs. In a typical embodiment, the component weights add up to 1. For example, when two or more component models all have equal weight, the hybrid score is the average (arithmetic mean) of the component scores. In another example, when scores are based on log-probabilities, the hybrid score reflects the geometric mean of the model probabilities, thereby being sensitive to low probability values. In a linear probability model, low probability values are so near zero that they have no effect on the hybrid score—only the high weight of the high probability has significant effect. This is one reason a compressive function such as the logarithm is often useful in the context of interpolation.

A dynamic set of weights may be assigned (computed or adjusted) on an ongoing basis, based on variables dynamically associated with the state of the processing of the utterance. Examples of dynamic variables include context information, the sentence length, the first word transcribed, named entities within a transcription, number of speech tag components (e.g., nouns), parts of speech within a transcription, the domain, the presence of noise, partially matching content (for example, when two previous word sequence hypothesis have overlapping content that only partially matches), and other context variables. After assigning an initial set of weights, ongoing processing of the tokens of an utterance causes dynamic updates of the weights. The assignment of weights may be done according to a set of rules, a trained model, or a combination.

In an embodiment, a method of speech transcription includes computing a transcription hypothesis as a sequence of tokens. A first probability score of the transcription hypothesis is computed according to a first model. A second probability score of the transcription hypothesis is computed according to a second model. A hybrid score is then computed by interpolation between the first probability score and second probability score, where interpolation weights are dependent upon a dynamic variable.

DETAILED DESCRIPTION

Figure 1:
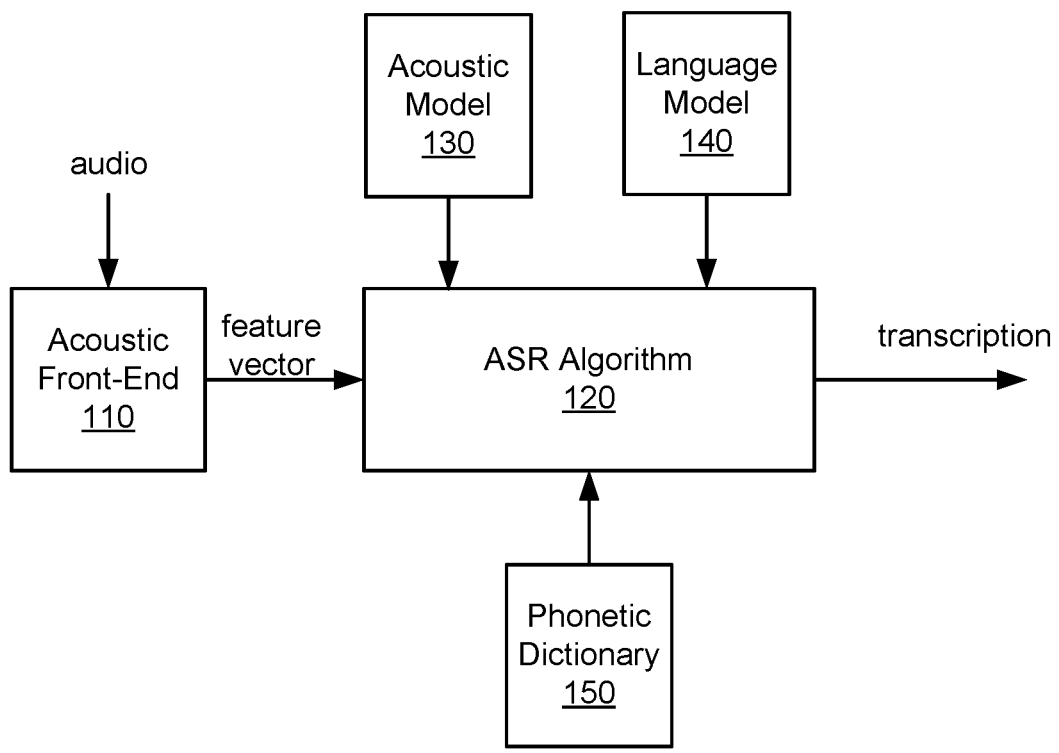
FIG. 1 is an exemplary process-centric block diagram of an ASR module.

While processing an utterance to determine the most likely transcription, an ASR system generates transcription hypotheses associated with probability scores from (notably) a language model. In a hybrid LM, scores are provided by a plurality of models, and the model scores are combined dynamically during the recognition of the speech. Model scores can be combined using weights, for example by linear interpolation. The purpose of the weights is to modulate the importance of various models, based on their estimated strength or weakness in a particular dynamic context, in order to improve the accuracy of the speech recognition process.

N-gram based LMs and neural network LMs serve essentially the same purpose, assigning scores of merit to hypothesized transcriptions. Experiments show that the two LM types exhibit different strengths and weaknesses, for example with respect to training time, runtime latency, and a number of other properties. Under some conditions, n-gram provides better accuracy. Under other conditions neural provides better accuracy. For instance, n-gram LMs are well suited for handling word sequence hypotheses for sentences having between 3-8 words, while neural network LMs are better suited at handling shorter and longer word sequence hypotheses outside that range.

Some prior art systems use a weighted average combination of n-gram and neural language models. See Generalizing and Hybridizing Count-based and Neural Language Models by Graham Neubig and Chris Dyer. See also NN-grams: Unifying neural network and n-gram language models for speech recognition by Babak Damavandi, Shankar Kumar, Noam Shazeer, and Antoine Bruguier. These prior art systems suffer from static weighted average combinations of the models. These prior art systems have a constant weighting between the models where the weighting is tuned for best accuracy across all conditions. It fails to be as accurate as possible under conditions where the n-gram model is more accurate and fails to be as accurate as possible under conditions where the neural model is more accurate.

The present ASR system uses a hybrid language model to combine the strengths of different statistical language models and improve the accuracy of ASR results. A hybrid score is created from dynamically generated weightings, which are generated from word sequence hypothesis that are updated periodically while processing an utterance. Dynamic variables are generated and used to create the weightings. As a result, the weightings are dynamically changing during speech recognition.

To summarize operation, a plurality of language models, such as for example an N-gram model and a neural network model, can process an utterance. At each point in the processing of the utterance, when a transcription hypothesis is considered, each of the plurality of models outputs a probability score for a transcription hypothesis. Each model score may be an estimate of the probability of the transcription hypothesis, a function of said probability estimate, such as for example, the logarithm of the probability estimate, or another figure of merit for the transcription hypothesis.

The hybrid LM interpolates component model scores to determine a hybrid LM score. The interpolation can use several methods to determine the hybrid LM score, such as for example as a weighted sum of the scores of the component LMs. In a typical embodiment, the component weights add up to 1. For example, when two or more component models all have equal weight, the hybrid score is the average (arithmetic mean) of the component scores. In another example, when scores are based on log functions of the probabilities, the hybrid score reflects the geometric mean of the model probabilities, thereby better utilizing low probability values. In a linear probability model, low probability values are so near zero that they have no effect on the hybrid score—only the high weight of the high probability has significant effect. This is one reason a compressive function such as the logarithm is often useful in the context of interpolation.

A dynamic set of weights may be assigned (computed or adjusted) on an ongoing basis, based on variables dynamically associated with the state of the processing of the utterance. Examples of dynamic variables include context information such as the sentence length, the first word transcribed in an utterance, named entities within a transcription, number of speech tag components (e.g., nouns) so far in a sentence, parts of speech within a transcription, user conversation knowledge, the domain, the presence of noise, partially matching content, and other context variables. After assigning an initial set of weights, ongoing processing of the tokens of an utterance causes dynamic updates of the weights. The assignment of weights may be done according to a set of rules, a trained module, or a combination.

A technical problem addressed by the present technology includes efficiently and accurately generating a transcription for a received utterance. N-gram based models and neural language models have different strengths, for example with respect to accuracy, training time, runtime latency, and other areas, as well as weaknesses. Previous attempts to transcribe an utterance using both N-gram and neural models have involved pre-set static usage of the models.

The present technology provides a technical solution to the technical problem of providing a more accurate ASR system. The technical solution involves dynamically interpolating probability scores from different models. The interpolated scores are generated based on a dynamic variable, such as for example sentence length, or other dynamic variables listed earlier. By dynamically adjusting the weights of model outputs at different times during speech recognition, the present technology provides a more accurate transcription by using the strengths of different models at the appropriate times.

FIG. 1 is a process-centric view of an Automatic Speech Recognition (ASR) system. In the system of FIG. 1, audio is received by an acoustic front-end 110. The acoustic front end generates feature vectors and provides the feature vectors to ASR algorithm 120. The feature vectors may be generated at a fixed periodic rate, such as every 10 milliseconds or some other time period. The ASR algorithm may include a neural network, such as a Viterbi decoder. The ASR algorithm unit 120 utilizes acoustic model 130, phonetic dictionary 150, and language model 140 to generate a transcription. The acoustic model can map the acoustic feature vectors to phonemic units (such as triphones). The phonetic dictionary maps between words and phonetic sequences. The language model assigns a probability score to every sequence of words. In processing the feature vectors with the AM, LM, and phonetic dictionary, the ASR algorithm unit 120 finds a best sequence of words as the most probable sequence of words for the received audio.

Figure 2:
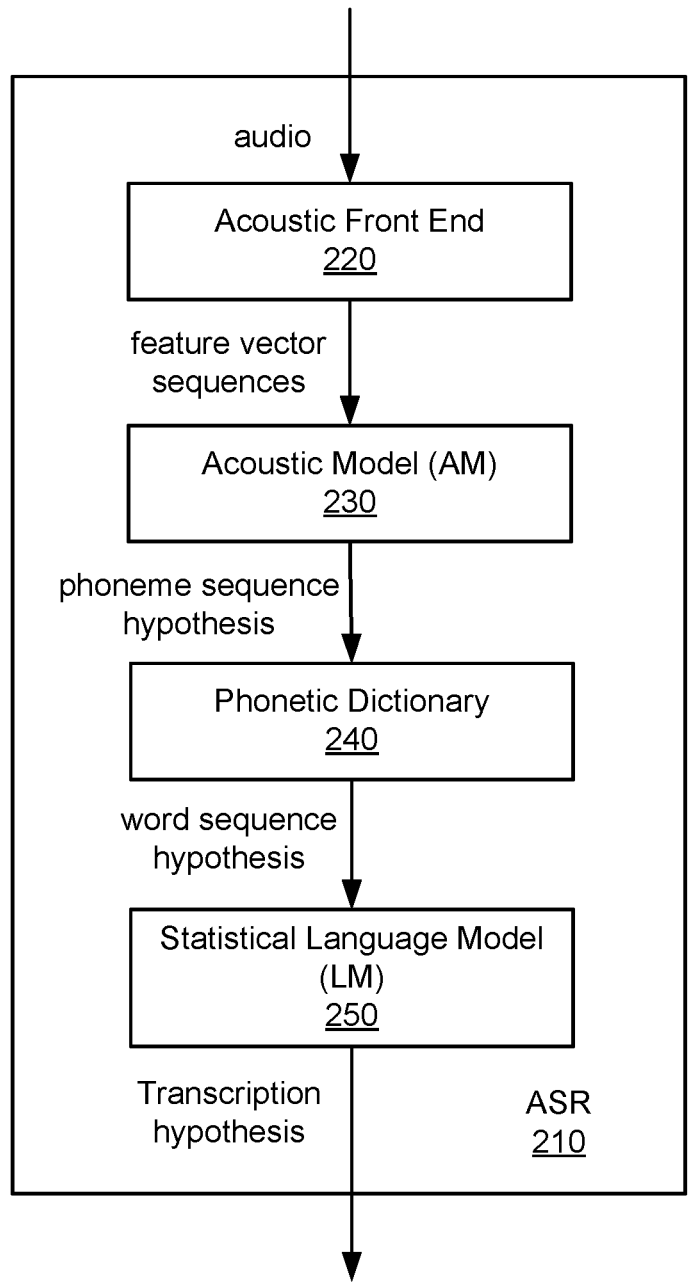
FIG. 2 is an exemplary resource-centric block diagram of the ASR module of FIG. 1.

FIG. 2 is an exemplary resource-centric block diagram of the ASR module of FIG. 1. The resources used in a typical ASR 210 as shown in FIG. 2 are an acoustic front end, acoustic model, phonetic dictionary, and statistical language model. Audio is received by ASR 210 and provided to acoustic front end 220. The acoustic front end generates feature vector sequences and provides the sequences to acoustic model 230. Acoustic model 230 generates and outputs phoneme sequence hypotheses from the feature vector sequences. A phonetic dictionary 240 is then used to generate word sequence hypotheses from the phoneme sequence hypotheses by ASR 210. The word sequence hypotheses are received by a statistical language model 250. The SLM, or LM, then generates a transcription hypothesis which is output by the ASR 210.

Figure 3:
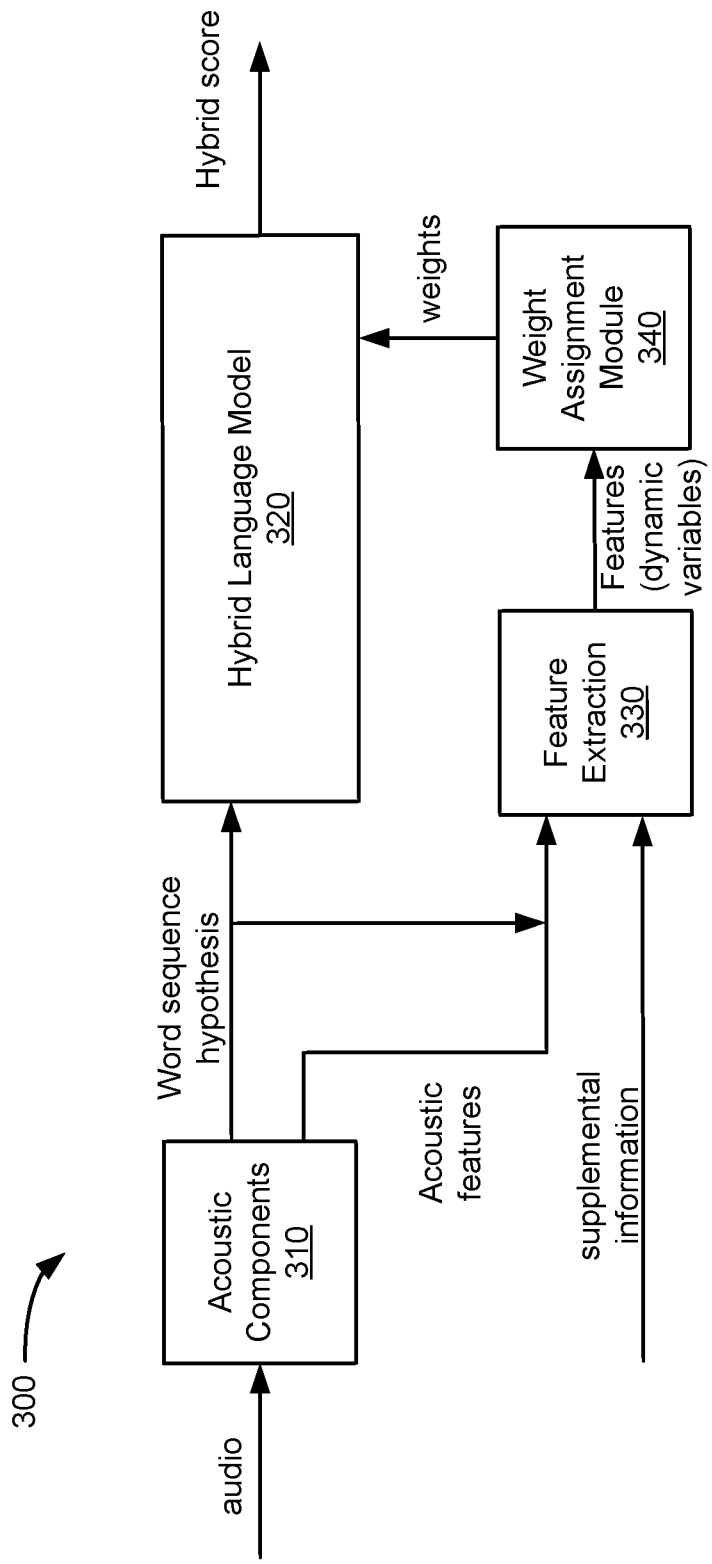
FIG. 3 is an exemplary block diagram of an ASR system with a dynamic hybrid language module.

FIG. 3 is an exemplary block diagram of an ASR system with a dynamic hybrid language module. Audio is received by acoustic components 310. The acoustic components include an acoustic front end and an acoustic model. The acoustic front end generates a word sequence hypothesis. The word sequence hypothesis can be provided to a hybrid language model 320 as well as feature extraction unit 330.

Hybrid language model 320 may utilize multiple language models to generate a hybrid score from the word sequence hypothesis. In some instances, hybrid language model 320 can include multiple component models, each of which may be implemented as an n-gram LM or neural network LM. The component LMs may each compute a score for the word sequence hypothesis. The computed scores may then be combined, using dynamically generated weighting, to provide a hybrid score by the hybrid language model. Hybrid language model is discussed in more detail with respect to FIG. 4.

The component scores generated by each component language model may be weighted by weights provided by weight assignment module 340. In some instances, the weighting is dynamically generated based on dynamic variables received from feature extraction unit 330. Hybrid language model 320 may use interpolation to generate a hybrid score from the weighted component scores generated from the dynamic variables. The weight assignment module 340 may utilize rules-based logic or neural networks to generate weights from the received dynamic variables. A weight assignment module is discussed in more detail with respect to FIG. 5A-5B.

In some instances, the dynamic variables are conditioned on the content of the transcription. The conditioning can be based on word presence, syntax structure, and semantic information. The dynamic variable can also depend on the content of a hypothesized transcription, wherein two or more transcription hypotheses have a similar portion.

Feature extraction 330 may receive word sequence hypothesis information, measures of other content from received audio such as acoustic features, and supplemental information to continually generate dynamic variables. The acoustic features can include, for example, noise amount, noise type, and speaker voice characteristics. The supplemental information may include domain information, geographic information, or other information not contained in the received audio. Dynamic variables that may be extracted include a part of speech, number of words transcribed so far, number of entities, and other dynamic variables.

Figure 4:
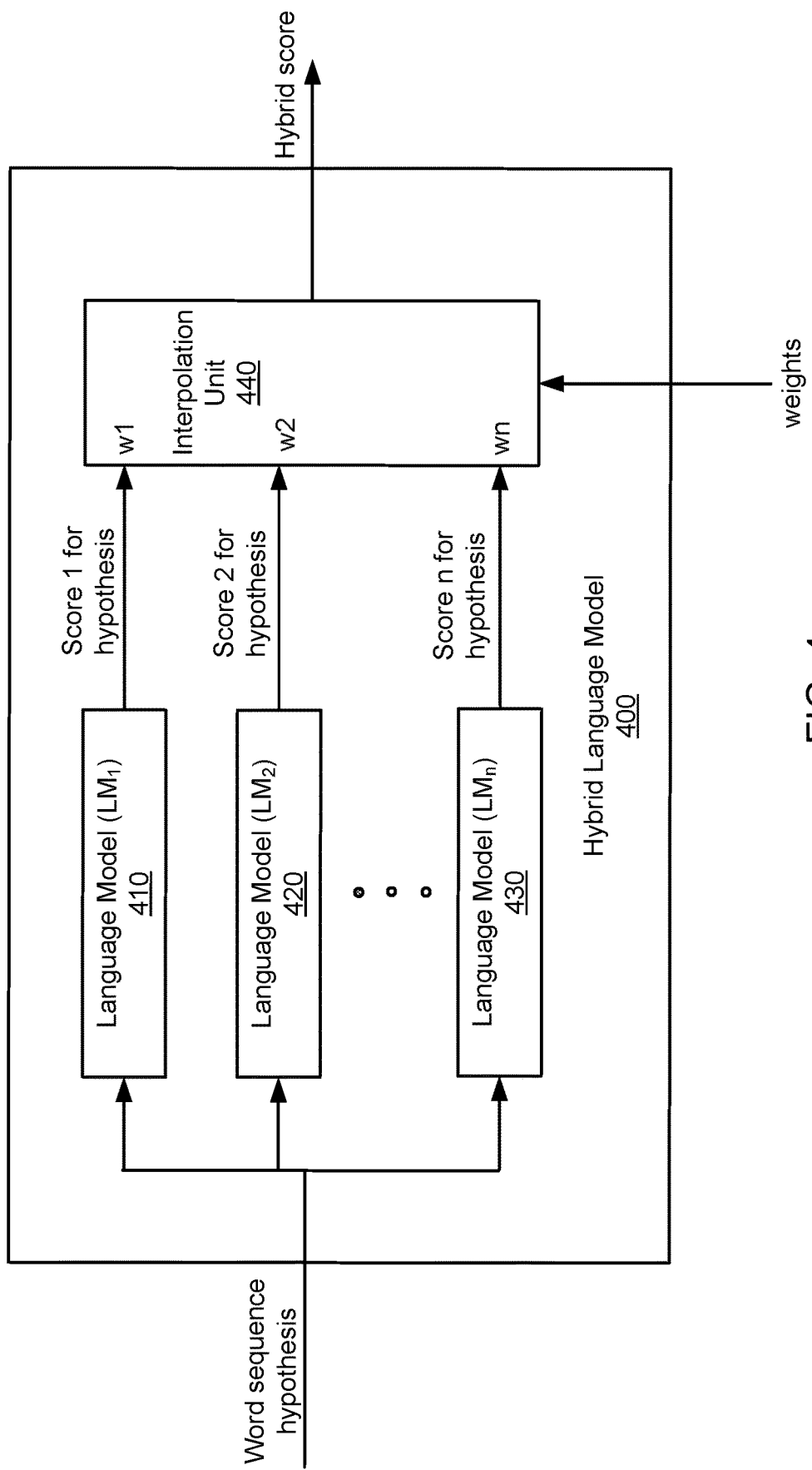
FIG. 4 is an exemplary block diagram of a dynamic hybrid language module.

FIG. 4 is an exemplary block diagram of a dynamic hybrid language module. Hybrid language model 400 of FIG. 4 provides more detail for hybrid language model 320 of the system of FIG. 3. Hybrid language model 400 receives a word sequence hypothesis and provides that hypothesis to each of n language models 410, 420, and so on through LM. 430. In some instances, the n number of language models includes two or more language models. The n language models may include different types of language models, such as n-gram language models, neural network language models, (such as recurrent neural network models) and other types of language models.

Each language model may output a probability for the word sequence hypothesis. In some instances, the probabilities may be converted to scores. The probabilities may vary in the range of almost 1 to 1 millionth or smaller. A function may be applied to one or more of the probabilities so that they are normalized or otherwise closer in range. For example, the log function may be applied to each probability, so that $1/10$ and 1 millionth may be converted to one and six, after taking absolute value, respectively. In some instances, different functions may be applied to different language models. For example, a straight log function may be applied to one probability while a log function multiplied by 10 may be applied to another probability.

Interpolation unit 440 may apply weights to the probabilities or scores for the n number of language models to generate a hybrid score for the word sequence hypothesis. In some instances, the weights may be applied to the component scores as a weighted sum. Hence, LM probabilities $p_1$, $p_2$, and so on through $p_n$, weights $w_1$, $w_2$, and so on through $w_n$ may be interpolated as a weighted sum as follows:

$$p_1 w_1 + p_2 w_2 + \ldots + p_n w_n = \text{hybrid score.}$$

Figure 5A:
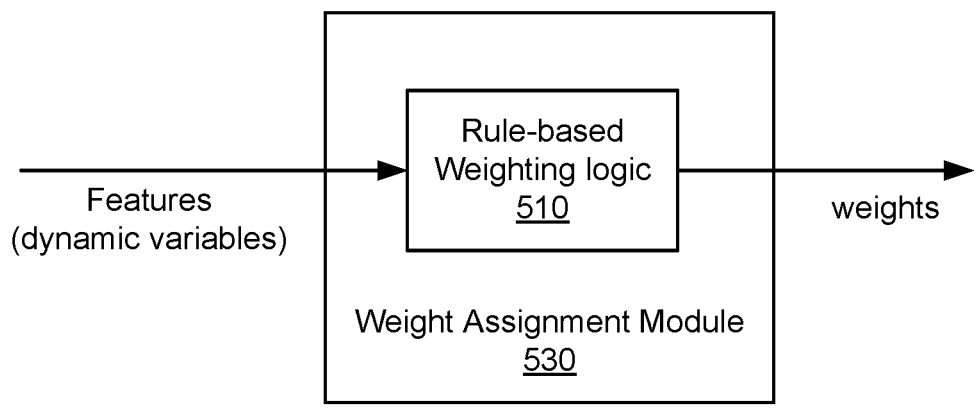
FIGS. 5A-5B are exemplary block diagrams of a weight assignment module.
Figure 5B:
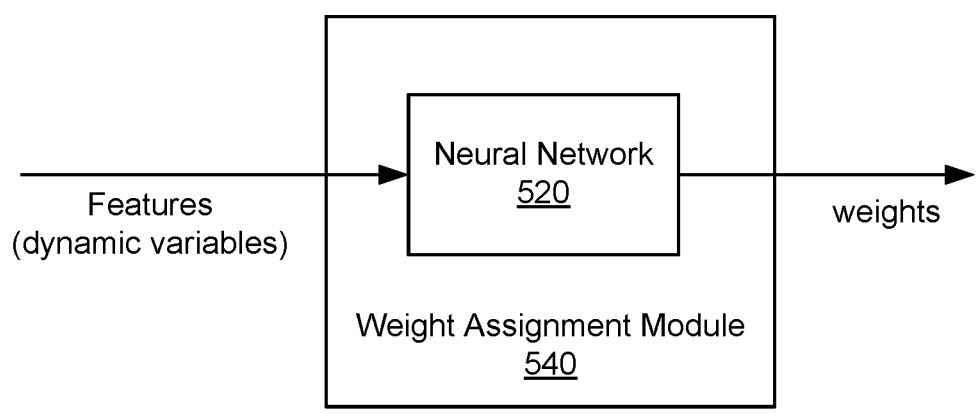

FIG. 5A-5B are exemplary block diagrams of a weight assignment module. The weight assignment module of FIGS. 5A and 5B provide additional detail for weight assignment module 340 of FIG. 3. A weight assignment module may include different mechanisms for generating weights from dynamic variables. As shown in FIG. 5A, the weight assignment module 530 may include rule-based weighting logic 510 to generate weights from dynamic variables. The rule-based weighting logic may apply rules to the dynamic variables as they are received to generate weights. For a dynamic variable of sentence length, the rule may indicate that a sentence having a length between three and eight words shall be processed by an n-gram language model, while a sentence having less than three words or greater than eight words will be processed by a neural network language model.

As shown in FIG. 5B, the weight assignment module 540 may be implemented as a neural network 520. In this case, the neural network may receive input in the form of dynamic variables, and may provide an output as weights. The weights output by the neural network 520 may be applied directly to the component hypotheses or scores output by language models in the hybrid language model.

Figure 6:
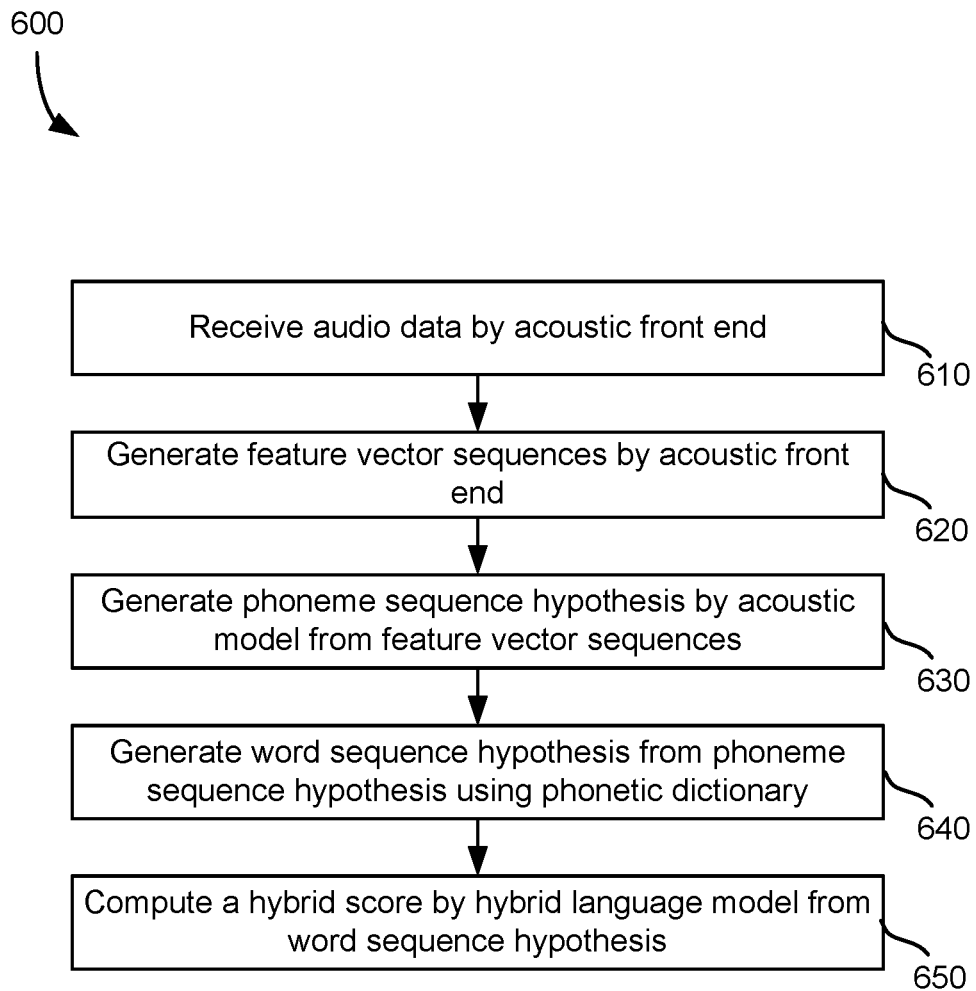
FIG. 6 is an exemplary method for performing speech recognition using a dynamic hybrid language model.

FIG. 6 is an exemplary method 600 for performing speech recognition using a dynamic hybrid language model. Audio data is received by an acoustic front-end at step 610. Feature vector sequences are then generated by an acoustic front-end from the audio at step 620. A phoneme sequence hypothesis is generated by an acoustic model from the feature vector sequences at step 630. A word sequence hypothesis is then generated by the ASR from the phoneme sequence hypothesis using a phonetic dictionary at step 640. A hybrid score is computed by a hybrid language model from the word sequence hypothesis at step 650.

Figure 7:
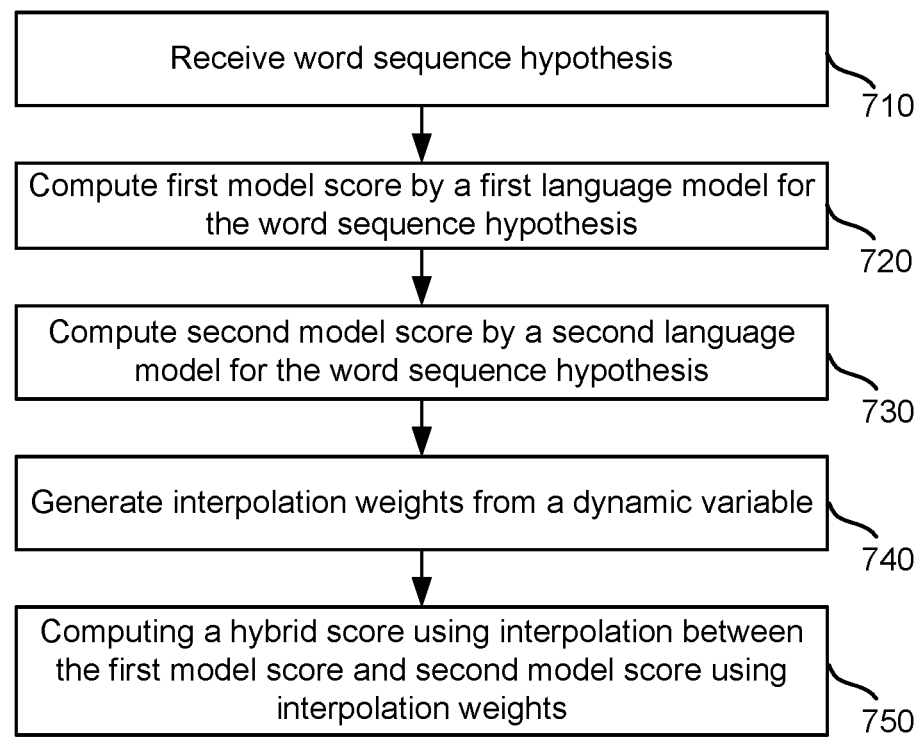
FIG. 7 is an exemplary method for computing a hybrid score by a dynamic hybrid language model.

FIG. 7 is an exemplary method for computing a hybrid score by a dynamic hybrid language model. The method of FIG. 7 provides more detail for step 650 of the method of FIG. 6. A word sequence hypothesis is received by the hybrid language model at step 710. A first model score is computed by a first language model for the received word sequence hypothesis at step 720. A second model score is computed by a second language model for the received word sequence hypothesis at step 730. The language models generating word sequence hypotheses step 720 and 730 are component language models within the hybrid language model. Any number of language models, in addition to the first and second language models, may generate additional model scores from the received word sequence hypothesis.

Interpolation weights may be generated from a dynamic variable at step 740. The interpolation weights may be generated by a weight assignment module from dynamic variables using rule-based logic or any type of neural network machine. The weights may be generated continually as dynamic variables or periodically generated from the word sequence hypothesis (or other word sequence hypotheses) and other context data.

A hybrid score is then computed using interpolation between the first model score and the second model score at step 750. The interpolation uses interpolation weights generated by the weight assignment module to generate the hybrid score from the component model scores. In some instances, the language models generate probabilities which are then processed by a function, such as a log function, to generate scores which are applied to the interpolation weights to generate the hybrid score. The function may be used to compress the scores that exist over a wide range.

Figure 8:
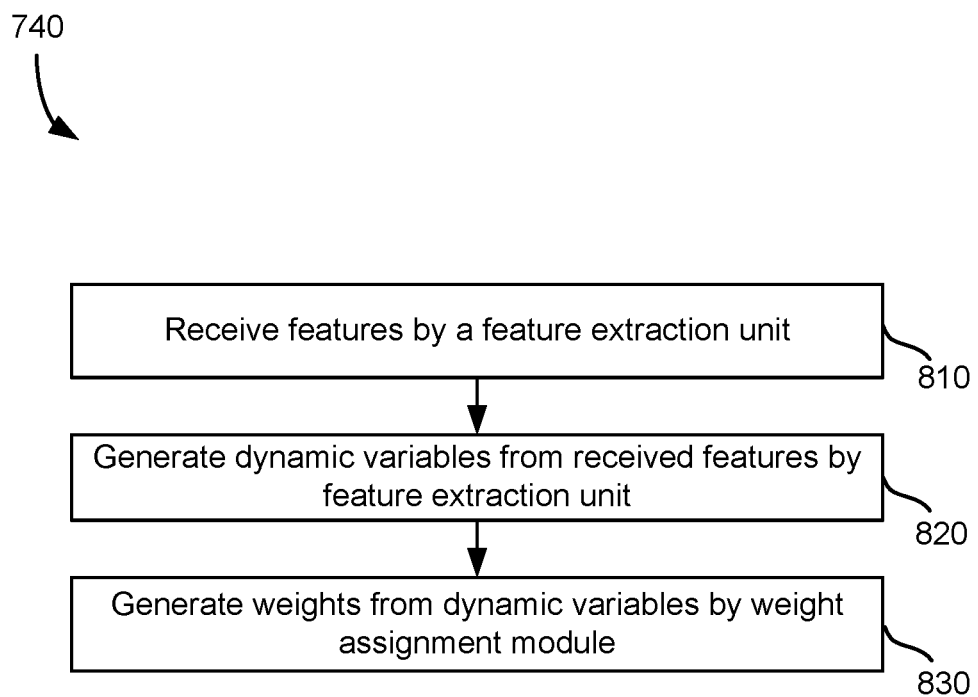
FIG. 8 is an exemplary method for generating weights from dynamic variables.

FIG. 8 is an exemplary method for generating weights from dynamic variables. Features are received by a feature extraction unit at step 810. The features may include information within a word sequence hypothesis, information from an audio signal received by an ASR, and other information, including domain information and geographic information. The features may include, for example, a current length of a sentence, parts of speech tags, and named entities within a current sentence. Dynamic variables are generated from the features at step 820. A feature extraction unit that receives the features may generate the dynamic variables as new features are repeatedly detected from a word sequence hypothesis, audio signal, and other data.

In some instances, a dynamic variable can be based on content of a subsequent hypothesized transcription. For example, feature extraction 330 of FIG. 3 can generate dynamic variables based on the content of the second hypothesized transcription. In this instance, a second transcription hypothesis is computed from the sequence of phonemes from which the dynamic variable will depend.

Weights are generated from the dynamic variables by a weight assignment module at step 830. The weights by may be generated by rules applied to the dynamic variables or a neural network that receives the dynamic variables as inputs and outputs the weights.

Figure 9:
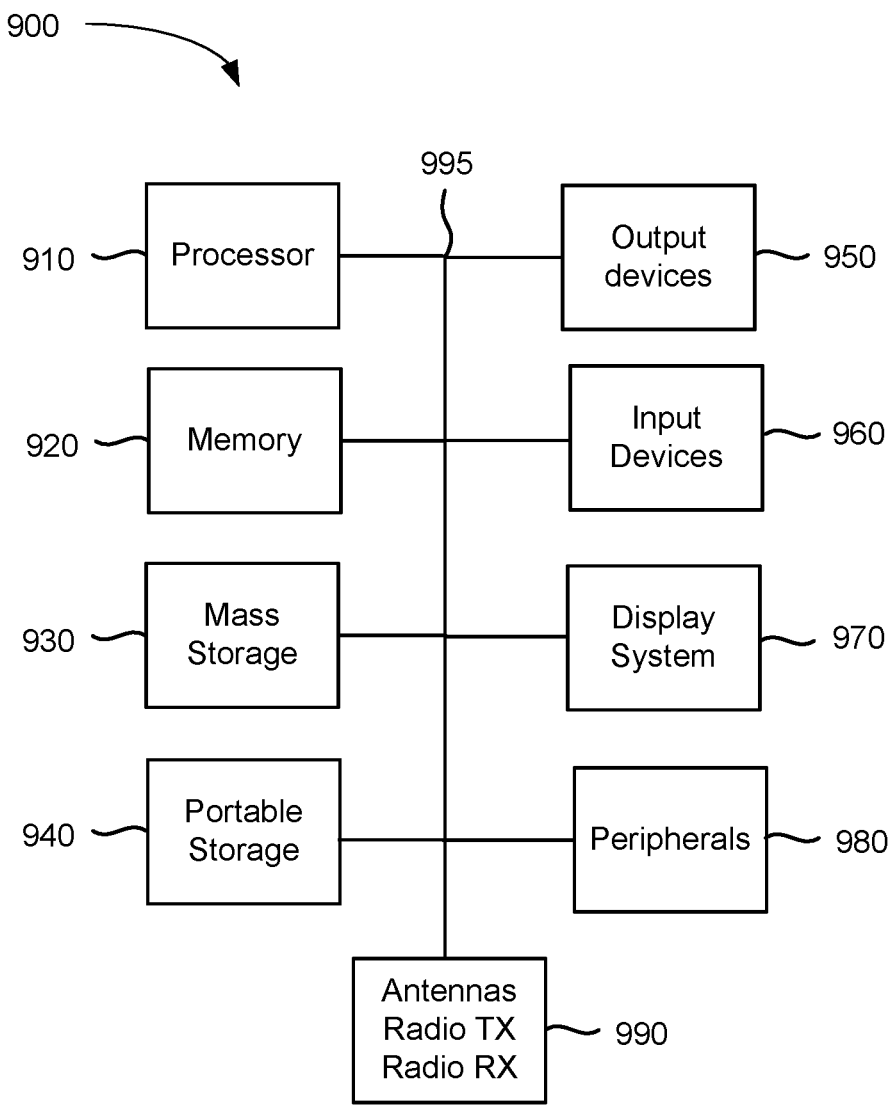
FIG. 9 is an exemplary block diagram of a computing environment.

FIG. 9 is an exemplary block diagram of a computing environment 900. System 900 of FIG. 9 may be implemented in the contexts of the likes of machines that implement the ASR module of FIG. 1. The computing system 900 of FIG. 9 includes one or more processors 910 and main memory 920. Main memory 920 stores, in part, instructions and data for execution by processor 910. Main memory 920 can store the executable code when in operation. The system 900 of FIG. 9 further includes a mass storage device 930, portable storage medium drive(s) 940, output devices 950, user input devices 960, a graphics display 970, and peripheral devices 980.

The components shown in FIG. 9 are depicted as being connected via a single bus 995. However, the components may be connected through one or more data transport means. For example, processor unit 910 and main memory 920 may be connected via a local microprocessor bus, and the mass storage device 930, peripheral device(s) 980, portable storage device 940, and display system 970 may be connected via one or more input/output (I/O) buses.

Mass storage device 930, which may be implemented with a magnetic disk drive, an optical disk drive, a flash drive, or other device, is a non-volatile storage device for storing data and instructions for use by processor unit 910. Mass storage device 930 can store the system software for implementing embodiments of the present invention for purposes of loading that software into main memory 920.

Portable storage device 940 operates in conjunction with a portable non-volatile storage medium, such as a floppy disk, compact disk or Digital video disc, USB drive, memory card or stick, or other portable or removable memory, to input and output data and code to and from the computer system 900 of FIG. 9. The system software for implementing embodiments of the present invention may be stored on such a portable medium and input to the computer system 900 via the portable storage device 940.

Input devices 960 provide a portion of a user interface. Input devices 960 may include an alpha-numeric keypad, such as a keyboard, for inputting alpha-numeric and other information, a pointing device such as a mouse, a trackball, stylus, cursor direction keys, microphone, touchscreen, accelerometer, and other input devices. Additionally, the system 900 as shown in FIG. 9 includes output devices 950. Examples of suitable output devices include speakers, printers, network interfaces, and monitors.

Display system 970 may include a liquid crystal display (LCD) or other suitable display device. Display system 970 receives textual and graphical information and processes the information for output to the display device. Display system 970 may also receive input as a touchscreen.

Peripherals 980 may include any type of computer support device to add additional functionality to the computer system. For example, peripheral device(s) 980 may include a modem or a router, printer, and other device.

The system of 900 may also include, in some implementations, antennas, radio transmitters and radio receivers 990. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth device, and other radio frequency networks. The devices may include one or more radio transmitters and receivers for processing signals sent and received using the antennas.

The components contained in the computer system 900 of FIG. 9 are those typically found in computer systems that may be suitable for use with embodiments of the present invention and are intended to represent a broad category of such computer components that are well known in the art. Thus, the computer system 900 of FIG. 9 can be a personal computer, hand held computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, as well as languages including Java, .NET, C, C++, Node.JS, and other suitable languages.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method of speech transcription, the method comprising:
   receiving a speech utterance;
   inferring a sequence of phonemes from the speech utterance according to an acoustic model;
   computing a plurality of transcription hypotheses from the sequence of phonemes;
   computing, according to a first model, a first model score for the transcription;
   computing, according to a second model, a second model score for the transcription;
   computing a hybrid score by interpolation between the first model score and second model score using interpolation weights, where a first interpolation weight is applied to the first model score and a second interpolation weight is applied to the second model score and at least one of the weights is dynamic and conditioned on the content of the transcription based on word syntax structure and semantic information;
   choosing one of the transcriptions based on the hybrid score; and
   outputting the chosen hypothesis as the transcription of the speech.

2. The method of claim 1, wherein the conditioning is based on word presence.

3. The method of claim 1, wherein the conditioning is based on semantic information.

4. The method of claim 1, wherein the first model is an n-gram model and the second model is a neural network.

5. The method of claim 1, wherein the interpolation weights are generated using rule-based logic.

6. The method of claim 1, wherein the interpolation weights are generated using a neural network.

7. The method of claim 1, wherein the first model score and second model score are generated using a function that compresses the values of the first model score and the second model score.

8. The method of claim 1, wherein the interpolation generates the hybrid score using a weighted sum function.

9. A non-transitory computer readable storage medium having embodied thereon a program, the program being executable by a processor to perform a method for speech transcription, the method comprising:
   receiving a speech utterance;
   computing a plurality of transcription hypotheses from a sequence of phonemes inferred from an acoustic model;
   computing, according to a first model, a first model score for the transcription;
   computing, according to a second model, a second model score for the transcription;
   computing a hybrid score by interpolation between the first model score and second model score using interpolation weights, where a first interpolation weight is applied to the first model score and a second interpolation weight is applied to the second model score and at least one of the weights is dynamic and conditioned on the content of the transcription based on word syntax structure and semantic information;
   choosing one of the transcriptions based on the hybrid score; and
   outputting the chosen hypothesis as the transcription of the speech.

10. The non-transitory computer readable storage medium of claim 9, wherein the conditioning is based on word presence.

11. The non-transitory computer readable storage medium of claim 9, wherein the conditioning is based on semantic information.

12. The non-transitory computer readable storage medium of claim 9, wherein the first model is an n-gram model and the second model is a neural network.

13. The non-transitory computer readable storage medium of claim 9, wherein the interpolation weights are generated using rule-based logic.

14. The non-transitory computer readable storage medium of claim 9, wherein the interpolation weights are generated using a neural network.

15. The non-transitory computer readable storage medium of claim 9, wherein the first model score and second model score are generated using a function that compresses the values of the first model score and the second model score.

16. The non-transitory computer readable storage medium of claim 9, wherein the interpolation generates the hybrid score using a weighted sum function.

* * * * *